A. MUIRHEAD, J. A. BRIGGS, & G. K. WINTER.
Duplex-Telegraph.
No. 227,040. Patented April 27, 1880.
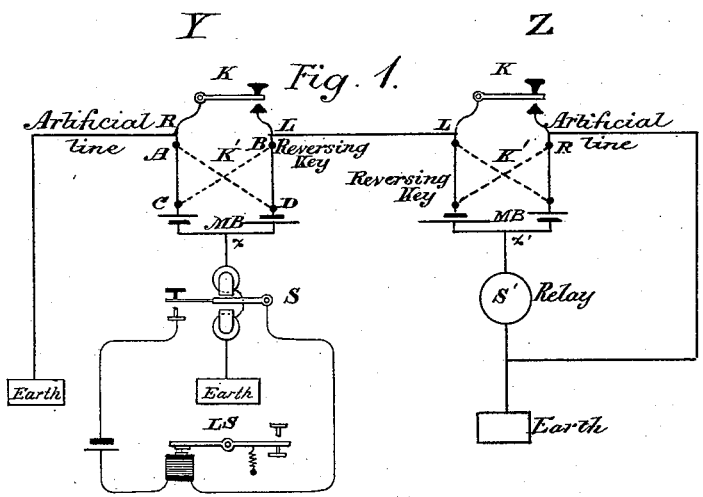
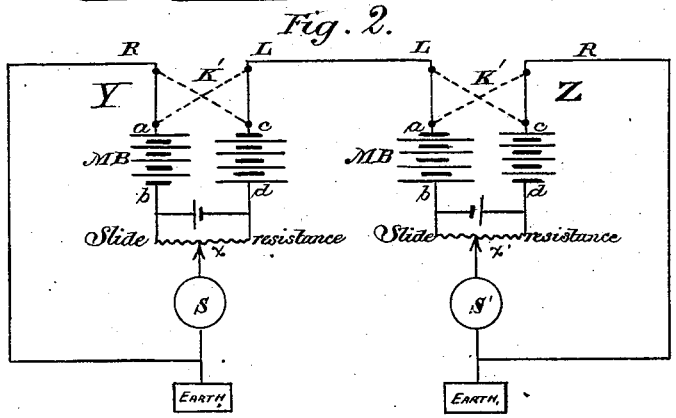

United States Patent Office.

ALEXANDER MUIRHEAD, OF WESTMINSTER, ENGLAND, JAMES A. BRIGGS, OF JUBBULPORE, AND GEORGE K. WINTER, OF ARCONAM, IN MADRAS, INDIA.

DUPLEX TELEGRAPH.

SPECIFICATION forming part of Letters Patent No. 227,040, dated April 27, 1880.

Application filed October 3, 1879. Patented in England November 12, 1878.

*To all whom it may concern:*

Be it known that we, ALEXANDER MUIRHEAD, doing business at 29 Regency street, Westminster, England, and residing at Oakwood, Farquhar Road, Upper Norwood, London, England, JAMES ALFRED BRIGGS, at present residing at Jubbulpore, in the Empire of India, and GEORGE KIFT WINTER, at present residing at Arconam, in the Presidency of Madras, in said Empire, all subjects of the Queen of Great Britain, jointly have invented certain new and useful Improvements in Duplex Telegraphy, of which the following is a specification.

Our invention relates to that system of duplex telegraphy in which a true line and an artificial line, the latter balanced as to resistance and capacity, are employed, as exemplified, for instance, in United States Letters Patent No. 208,665, granted to John Muirhead, Jr., October 1, 1878.

It has heretofore been proposed to operate duplex telegraphs by throwing the battery on and off the line, by short-circuiting the battery, or by reversing it; but, so far as our knowledge extends, all such plans involve the use of a bridge or other differential arrangements of apparatus.

The objects of our invention, speaking generally, are to avoid the well-known objections to these differential methods while attaining the advantages of duplex transmission, and to secure a simple and effective working apparatus, which ends we attain by placing the battery between a true and an artificial line and connecting the receiving apparatus between an intermediate point of the battery (so as to divide or split it) and the earth, thus throwing one portion of the battery upon the true and the other upon the artificial line.

The special object of the first part of our invention is to be able to reverse the current at the receiving-station without the use of a differential apparatus, which end we attain by combining in a telegraphic circuit a true or main line connecting the stations, and providing at each station an artificial or compensating circuit, a battery interposed between the true and artificial lines or circuits, a receiving apparatus between an intermediate point in the battery and the earth, and a key for reversing or short-circuiting the battery.

The special object of the next part of our invention is to compensate variations in the electro-motive force or resistances of the two sections of the split battery which we use in carrying out our invention, which end we attain by combining in a telegraphic circuit a true or main line, an artificial or compensating circuit, a split battery interposed between said true and artificial lines, a reversing or short-circuiting key, a slide-resistance shunting one or more cells of the battery, and a receiving apparatus or relay interposed between the contact-point of the slide and the earth.

The special object of the next part of our invention is to obviate objections arising from variations in the electro-motive force of the battery while being worked, which end we attain by combining in a telegraphic circuit a true and an artificial line, an interposed split battery, a receiving apparatus or relay interposed between an intermediate point in the battery and the earth, and a reversing-key crossing the connections between the true and artificial lines.

In the accompanying drawings, which are diagrams illustrating the arrangement or organization of apparatus which we have found in practice to produce the best results, Figure 1 shows both the short-circuiting and reversing apparatus, and Fig. 2 the reversing apparatus alone.

Two stations are shown in the drawings; but the arrangements at each being the same, a description of one will be sufficient to explain the working of the apparatus.

The telegraphic circuit shown consists of a true or main line, L, with an artificial line or compensating circuit, R, at each station. The battery M B is split or divided into two sections, one pole of which is connected with the true line and the other with the artificial line, the copper pole being connected with one line and the zinc pole with the other.

A suitable relay or receiving-instrument, S S', is placed in the circuit between the battery and the earth, its point of connection $x$ being intermediate of the two sections of the battery. In order to maintain the proper balance between the two sides of the battery, we connect the relay therewith by a slide-resistance of well-known construction, which will shunt one or more cells of either section of the battery, as required.

Fig. 1 shows, as before remarked, both a short-circuiting key, K, and a reversing-key, K′, either one of which may be employed to produce signals, the construction and mode of operation of which keys are well understood. The continuous lines represent the connections when the keys are at rest and the dotted lines the connections when the keys are closed. K′ in each figure represents the path of the current under different positions of the keys. While we have produced good results by short-circuiting, experience has demonstrated the superiority of the reversing plan, which we therefore prefer.

The operation of the apparatus will readily be understood from the foregoing explanation. The normal condition of the apparatus is that of a closed telegraphic circuit; but when the keys are open, although the circuit still remains closed, no current flows through the true line, because of the opposition or balancing of the two sections of the battery connected therewith at each end; but currents may flow through the receiving-instruments and artificial lines. The coils of the relays or receiving-instruments are so arranged that these currents produce a bias in the relay tongues or armatures, which bias serves to prevent the working of the local sounder L S or other apparatus.

When operating with the short-circuiting apparatus the closing of a key short-circuits the battery at that end of the line, and the section of it connected to the true line no longer opposes the battery at the opposite end. Thus less bias is produced in the relay or receiving apparatus at the receiving-station in a proper direction to make a signal, but at the transmitting-station the current flowing through the relay is not altered, and its local apparatus therefore remains quiet. Should both keys be depressed at the same time the currents flowing through the relays cease, thus leaving their tongues insufficiently biased, and consequently signals are produced in both local circuits. The coils of the relays are so connected between the middle of battery and earth that a current upward causes the tongues to close the local circuits.

In working with the reversing-keys, the continuous lines represent the circuit-connections when the keys are open and the dotted lines those when they are closed. With the keys open one pole of the battery is connected to the true line and the opposite pole to the artificial line. In this position a current flows from copper to earth downward, passing through both relays, so that neither local circuit is closed. The closing of the key reverses these conditions, as is well understood. The effect of this reversal is to throw that section of the battery already on the true line upon the artificial line, and to throw that section upon the artificial line upon the true line, where it co-operates with, instead of opposing, the section already connected to the true line at the receiving-station, thus overcoming the bias of the relays and producing a signal. No effect is produced, however, at the home-station, as the real line and the artificial line are balanced or interchangeable.

The above-described operation is, of course, repeated at each manipulation of the key. For instance, on closing key at station Y, the battery is reversed. Only the current at station Z is reversed, however, as the current from copper at Z flows to line through relay at Y, to earth, and upward through relay at Z, thus closing local circuit at Z only. When both keys are closed both batteries are reversed. Zinc is to line at both ends. The unopposed halves of the batteries are reversed as regards the relays. Consequently the current through both relays is the reverse of that when both keys are open, and therefore both local circuits are closed.

By our arrangement we are thus enabled to obtain a perfectly-balanced apparatus in the true and artificial lines by properly balancing or adjusting the capacity of the true and artificial lines, which balance is perfectly independent of any change in the resistance and electro-motive forces of the two sections of the battery, any inequality in which will merely cause a current to flow through the receiving-instrument, but which current remains the same whether a signal is sent or not—that is, without regard to whether the battery is direct or reversed.

It will seen that, so far as the receiving-instrument and batteries are concerned, it is really the true and artificial lines only that are effected by the reversing-key. They mutually replace one another in two portions of the circuit external to the instrument and the batteries. We have therefore given the name of "double substitution" to this improved form of split-battery duplex working, in order to distinguish it from what has heretofore been known simply as the "split-battery system," which, although apparently similar in appearance to our split-battery system, differs essentially from it in principle, for, whereas in the old split-battery system the balance depends upon the maintenance of a strict proportion between the electro-motive forces of the two sections of the battery and the resistance of the true and artificial lines, the balance in our improved method of double substitution depends only upon the equality of the true and artificial lines, which, however, experience shows may differ widely without affecting injuriously the received signals.

Our plan also differs essentially from that suggested by Heaviside, of throwing the battery on or off the line.

In order to equalize the electro-motive force of the sections of the battery in a battery composed of unequal cells under our improved system, it is only necessary to connect the receiving-instrument slightly out of the center of the battery. This we do by shunting one or more of the cells of the battery by a slide-resistance of well-known construction, equal to about three or four times the resistance of the cells so shunted, the receiving-instrument being connected with the battery between the contact-point of the slide and the earth.

The object of inserting a slide-resistance with movable contact-piece across the intermediate cells of a battery composed of cells of unequal electro-motive force is to adjust the position of the relay-circuit placed between $x$ and earth, so that there shall be the same difference of potential between $a$ and $x$ as between $c$ and $x$. Supposing $a\,b$ is stronger in electro-motive force by a fraction of a cell than $c\,d$, then by trial a point can be found at which the potential is zero—$i.\,e.$, the middle point of the battery.

Experience has demonstrated our improvements to possess the following merits: first, a very wide working range—that is to say, the artificial line may be altered within wide limits without affecting the signals; second, no special winding of the coils is required, as in the differential system; third, the sensitiveness of the relay is not reduced and magnetic retardation is not increased by bridge-wires, as in the bridge system.

The above-described organization admits of being readily duplexed by the combination with it of suitable double or multiple transmitting apparatus, which organization consists of a quadruplex or multiplex system of telegraphy not herein claimed, as it forms the subject-matter of the joint application for United States Letters Patent filed by Alexander Muirhead and George K. Winter simultaneously herewith, and shown in British Letters Patent No. 4,590, of November 12, 1878.

We do not broadly claim herein the specific construction of any of the devices herein shown considered by themselves, as such construction forms no part of the subject-matter herein claimed, which is limited to the new combinations of old instrumentalities herein set forth.

We claim as our own joint invention—

1. The combination, substantially as hereinbefore set forth, in a telegraphic circuit, of a true or main line connecting the stations and at each station an artificial or compensating circuit, a battery interposed between the true and artificial lines, a receiving apparatus between an intermediate point in each battery and the earth, and a key for reversing or short-circuiting the battery.

2. The combination, substantially as hereinbefore set forth, in a telegraphic circuit, of a true or main line, an artificial or compensating circuit, a split battery interposed between said true and artificial lines, a reversing or short-circuiting key, a slide-resistance shunting one or more cells of the battery, and a receiving apparatus interposed between the contact-point of the slide and the earth.

3. The combination, substantially as hereinbefore set forth, of a true and an artificial line or compensating circuit, an interposed split battery, a receiving apparatus interposed between an intermediate point of the battery and the earth, and a reversing-key crossing the connections between the true and the artificial line.

ALEX. MUIRHEAD.
J. A. BRIGGS.
G. K. WINTER.

Witnesses to the signature of Alexander Muirhead:
 JNO. DEAN,
*Notary's Clerk, No. 17 Gracechurch St., London.*
 G. P. NICHOLSON,
*Notary's Clerk, No. 17 Gracechurch St., London.*

Witnesses to the signature of J. A. Briggs:
 WM. POOLE,
 HARA DHONE BAUERZZA.

Witnesses to the signature of George Kift Winter:
 JAMES T. MORGAN,
*Solicitor, Madras.*
 JO. D' SYLVA,
*Clerk to Messrs. Tasker & Wilson, Solicitors, Madras.*